UNITED STATES PATENT OFFICE 2,350,265

PYRIMIDINE COMPOUNDS

Robert R. Williams, Summit, N. J., and Joseph K. Cline, Birmingham, Ala., assignors to Research Corporation, New York, N. Y., a corporation of New York No Drawing. Application December 24, 1937, Serial No. 181,710, which is a division of application Serial No. 134,334, April 1, 1937. Divided and this application July 23, 1943, Serial No. 495,896. In Germany May 29, 1937

20 Claims. (Cl. 260—251)

This invention relates to pyrimidine compounds useful for the production of antineuritic compounds and, particularly, to the synthesis of pyrimidine compounds and various other intermediates which are useful for the production of vitamin $B_1$, salts thereof, and related products having the essential physiological properties of vitamin $B_1$. This application is a division of our copending application Serial No. 181,710, filed December 24, 1937, as a division of application Serial No. 134,334, filed April 1, 1937, which applications matured on September 7, 1943 into Patents 2,328,595 and 2,328,594, respectively.

The present invention relates to methods by which vitamin $B_1$ and kindred compounds may be synthesized. These syntheses make available vital substances which may be incorporated in pharmaceutical products and in foods deficient in vitamin $B_1$.

An object of the invention is to provide pyrimidine compounds and other intermediates useful in the synthesis of vitamin $B_1$, its salts, and related compounds having the essential physiological properties thereof.

Another object of the invention is to provide effective and reliable processes for the production of pyrimidine compounds and other intermediates useful in the synthesis of vitamin $B_1$, its salts and related compounds having similar physiological reactions.

Vitamin $B_1$ is obtained from natural sources in the form of its acid salts, usually as the chloride hydrochloride. These salts have the following general structure:

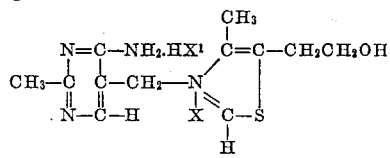

in which X is an anion and $HX^1$ is an acid, the anion portion of which may or may not be the same as the one represented by X.

The syntheses by which such acid salts of vitamin $B_1$ are produced comprise the coupling of two distinct radicals or groups to form the vitamin or other closely allied substance. One of these groups is a derivative of pyrimidine having the constitution indicated by the following formula:

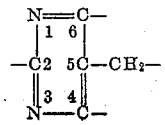

This has been termed the pyrimethyl group and the atoms of the pyrimidine ring portion thereof have been numbered as shown in the structural formula given hereinabove to designate the positions of any attached groups or elements. It is to be understood that when the term "pyrimethyl" is used herein or in the annexed claims to define a compound, it means that the group or element following this term is attached to the $CH_2$— group located in the 5-position on the pyrimidine ring portion of the compound. It will be observed that in vitamin $B_1$, the methyl group and the amino group are attached to the pyrimethyl group in the 2 and 6 positions, respectively, and that hydrogen is in the 4-position.

The other radical entering into the coupling reaction is a substituted thiazole nucleus. A basic thiazole compound which may be used with satisfactory results is the one designated 4-methyl-5-$\beta$-hydroxy-ethyl thiazole. This compound is described in Patent No. 2,134,015 granted October 25, 1938, to R. R. Williams for Thiazole compounds.

It has been found that one of the instrumentalities by which the pyrimethyl radical can be coupled to a thiazole group is a salt of a pyrimethyl ester, such as 2-methyl-6-amino-pyrimethyl-bromide hydrobromide, which has the formula:

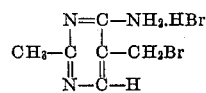

It has been found that effective results may be obtained by first producing a mixed ether such, for example, as 2-methyl-6-amino-pyrimethyl-ethyl ether or 2 - methyl-6-amino-pyrimethyl methyl ether and to obtain acid esters therefrom having the formula

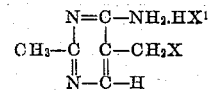

in which X is an acid radical in non-ionic combination and $HX^1$ is an acid, the anion portion of which may or may not be the same as the acid radical represented by X.

The following description will include a disclosure of a series of useful intermediate compounds containing the pyrimethyl radical from which the above esters may be prepared, one group comprising the ethers having the general formula:

$$R^1-\underset{\underset{N-C-H}{\|}}{C}\underset{\underset{}{\|}}{\overset{N=C-OH}{C}}-CH_2OR^2$$

wherein $R^1$ and $R^2$ are respectively alkyl or aralkyl radicals (methyl, ethyl, propyl, benzyl, etc.). By replacing the 6-oxy radical of this compound with a 6-amino radical and the $-OR^2$ group with an acid radical, e. g. the sulphate or a sulphonate or bromine, a compound is produced which is capable of coupling with a thiazole nucleus as above set forth to produce an acid salt of vitamin $B_1$ or a related compound having the antineuritic properties thereof.

*Example*

A suitable pyrimethyl ester for use in the coupling reaction is 2-methyl-6-amino-pyrimethyl-bromide hydrobromide and one process for making this bromide ester comprises a series of steps including those set forth in the aforementioned copending applications which are substantially as follows:

1. β-Ethoxy-propionic-ethyl ester
2. Sodio-formyl-β-ethoxy-propionic-ethyl ester
3. 2-methyl-6-oxy-pyrimethyl-ethyl ether
4. 2-methyl-6-chlor-pyrimethyl-ethyl ether
5. 2-methyl-6-amino-pyrimethyl-ethyl ether The sequence and significance of these steps may be made more apparent by writing the structural formulae of the compounds as follows:

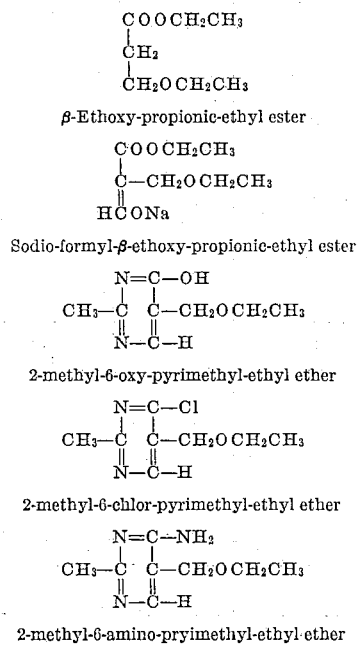

The steps in the following detailed disclosure correspond to the numbers in the above schedule.

*Step 1.*—A mixture of 116 gms. of sulphuric acid (sp. g. 1.84), 18 gms. of water, 200 cc. absolute alcohol, and 99 gms. of β-ethoxy-propionitrile is heated, under refluxing, for about six hours. At the end of this time, the mixture is cooled and allowed to stand until all the ammonium bisulphate produced has crystallized out. The ammonium bisulphate is filtered off, washed several times with absolute alcohol, and the combined filtrate and washings are distilled to remove the major portion of alcohol. Ice water is added to the residue, the excess acid neutralized, and the solution finally made slightly basic by the addition of sodium carbonate. The mixture is then extracted with ether, the ethereal solution dried over sodium sulphate, and the solution fractionated by distillation. β-ethoxy-propionic-ethyl ester is obtained in the form of a pleasant smelling, water-white liquid having a boiling point of about 70–72° at 24 mm. pressure. In this reaction compounds having alkyl radicals (and aralkyl radicals) other than the ethyl radical can be substituted.

*Step 2.*—A mixture of 73 gms. of β-ethoxy-propionic-ethyl ester and about 40 gms. of ethyl formate is slowly dropped onto 12 gms. of sodium wire covered with anhydrous ether. Hydrogen is evolved, and a yellow salt precipitates out of the ether. If the reaction proceeds slowly, without causing ebullition of the ether, the amount of sodium specified is sufficient. However, if the reaction proceeds violently, increasing amounts of sodium up to a total of two equivalents may be necessary. For best results, the time for addition of the ester is about eight hours. The thus formed sodio-formyl derivative is used without isolation in the succeeding reaction. It must be protected from atmospheric moisture and should be used promptly, as it is not very stable.

Instead of the above described derivative, compounds having the general formula:

wherein R and $R^1$ are alkyl or aralkyl radicals and M is an alkali metal, may be produced from appropriate reagents, if desired, by a similar method and used in the succeeding step.

*Step 3.*—To the ether suspension of the sodio-formyl derivative obtained in Step 2, 45 gms. of acetamidine hydrochloride, 100 cc. of absolute alcohol, and a solution of 12 gms. of sodium in 200 cc. of absolute alcohol are added. The ether is distilled off, and the mixture heated, under refluxing, for about sixteen hours. The contents of the flask are then cooled, neutralized with 10% acetic acid, and evaporated down on a steam bath. The residue is taken up in a small amount of water and extracted repeatedly with chloroform. The combined chloroform extracts are dried with sodium sulphate and the chloroform removed by evaporation. The remaining brown, gummy substance is treated with dioxane, after which a portion dissolves and a considerable quantity of the gum is solidified. The solid is dried and sublimed in high vacuo at 140° C. The sublimate is placed in a Soxhlet extractor and extracted repeatedly with anhydrous ether. The residue is dried and again sublimed in high vacuo, yielding substantially pure 2-methyl-6-oxy-pyrimethyl-ethyl ether having a melting point of about 175–176° C.

Instead of proceeding as above set forth the following preferred method of carrying out Step 3 may be employed:

To the reaction mixture obtained in Step 2, add carefully a mixture of 100 to 200 gms. of crushed ice and water, just sufficient to produce solution of the material. The ether separates and is removed. There is then added 45 gms. of acetamidine hydrochloride followed by 10 gms. of NaOH (in the form of a 30% NaOH solution). The mixture is allowed to stand 3 to 4 days, after which it is neutralized with strong hydrochloric acid and is then extracted repeatedly with chloroform. The chloroform solution is evaporated to dryness and the crude product, 2-methyl-6-oxy-pyrimethyl-ethyl ether, is dried to constant weight. For purification it can be crystallized from amyl ether.

Instead of the specific compound produced as above described, compounds having the general formula:

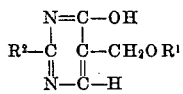

may be produced, wherein $R^1$ and $R^2$ are alkyl or aralkyl groups, by condensing compounds having the general formula indicated at the end of Step 2 with homologues of acetamidine, e. g. propamidine, butamidine, etc.

*Step 4.*—One gm. of 2-methyl-6-oxy-pyrimethyl-ethyl ether is heated with 8 cc. of phosphorous oxychloride for about three hours at 78° C. The phosphorous oxychloride is then removed in vacuo. The residue is poured onto ice and excess acid is neutralized by the addition of sodium bicarbonate or ammonia and the mixture extracted repeatedly with chloroform. The combined chloroform extracts are dried over sodium sulphate and the chloroform removed in vacuo. Approximately 1 gm. of an oily residue remains consisting largely of 2-methyl-6-chlor-pyrimethyl-ethyl ether.

By employing compounds having the general formula:

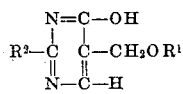

wherein $R^1$ and $R^2$ are alkyl or aralkyl radicals, compounds having the general formula

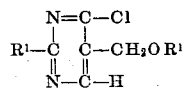

are obtained.

Instead of the 6-chlor pyrimethyl compounds just described, the corresponding 6-brom and 6-iodo compounds, which may be made in an analogous manner, may also be used if desired.

*Step 5.*—The product of Step 4 is treated with about 5 to 15 cc. of alcoholic ammonia in a bomb tube at about 140° C. for a period of time sufficient to convert all bromine into ionic form e. g. three hours. The contents of the tube are then evaporated down leaving a partly crystalline residue. This residue is dissolved in water, sodium bicarbonate or sodium carbonate is added and the solution extracted repeatedly with chloroform. The combined chloroform extracts are dried over sodium sulphate and the chloroform removed in vacuo, leaving an oily residue which crystallizes on standing and cooling. The crude product may be recrystallized from ether or ligroin, and pure 2-methyl-6-amino-pyrimethyl-ethyl ether, having a melting point of 89.5 to 90.5° C. is obtained. If desired, the crude product may be purified by repeatedly subliming it in high vacuo at 60° to 80° C.

By employing compounds having the general formula

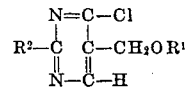

compounds having the formula

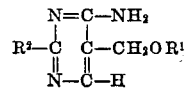

may be obtained, wherein $R^1$ and $R^2$ are alkyl or aralkyl radicals.

The 2-methyl-6-amino-pyrimethyl-ethyl ether produced in accordance with the process outlined in Step 5 may be treated in various ways to produce acid salts of 2-methyl-6-amino-pyrimethyl esters such, for example, as a hydrobromide of 2-methyl-6-amino-pyrimethyl-bromide. Processes for producing such acid esters are outlined in detail in the aforesaid application Serial No. 181,710 of which this application is a division. The acid esters thus produced may be coupled with a suitable thiazole to produce an antineuritic substance in accordance with procedures outlined in the aforementioned application Serial No. 134,334.

Although in the examples outlined hereinabove the substituted pyrimidine compounds have a methyl group located in the 2-position and a methylene group in the 5-position, the invention is not limited to these particular derivatives. For example, the methyl group in the 2-position on the pyrimidine ring may be replaced by homologues thereof, such as the ethyl and propyl groups. Where alkyl groups are described as substituents in the various compounds mentioned herein, aralkyl groups may, in general, be used with satisfactory results. Hence, when the term "alkyl" is used herein, it is also intended to embrace the aralkyl groups unless such groups are specifically excluded.

What is claimed is:

1. The process which comprises treating a compound having the formula:

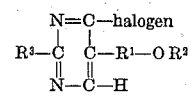

in which R and $R^2$ are members of the class consisting of alkyl and aralkyl groups and $R^1$ is an alkylene group, with ammonia to produce the corresponding 6-amino compound.

2. The process which comprises treating a compound having the formula:

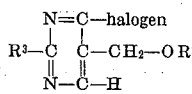

in which $R^2$ and $R^3$ are members of the class consisting of alkyl and aralkyl groups, with ammonia to produce the corresponding 6-amino compound.

3. The process which comprises treating a compound having the formula:

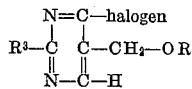

in which $R^2$ and $R^3$ are lower alkyl groups, with ammonia to produce the corresponding 6-amino compound.

4. The process which comprises treating a compound having the formula:

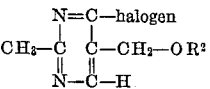

in which $R^2$ is a lower alkyl group, with ammonia to produce the corresponding 6-amino compound.

5. The process which comprises treating a compound having the formula:

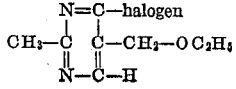

with ammonia to produce the corresponding 6-amino compound.

6. The process which comprises treating a compound having the formula:

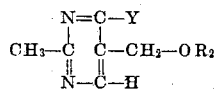

in which Y is one of the halogens, chlorine, bromine and iodine and $R^2$ is a lower alkyl group, with ammonia to produce the corresponding 6-amino compound.

7. The process which comprises treating a compound having the formula:

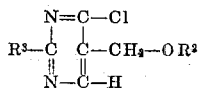

in which $R^2$ and $R^3$ are lower alkyl groups, with ammonia to produce the corresponding 6-amino compound.

8. The process which comprises treating a compound having the formula:

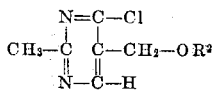

in which $R^2$ is a lower alkyl group, with ammonia to produce the corresponding 6-amino compound.

9. The process for the production of 2-methyl-6-amino-pyrimethyl-ethyl-ether which comprises treating 2-methyl-6-chloro-pyrimethyl-ethyl ether with ammonia.

10. The process which comprises treating a compound having the formula:

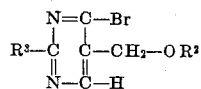

in which $R^2$ and $R^3$ are lower alkyl groups, with ammonia to produce the corresponding 6-amino compound.

11. The process which comprises treating a compound having the formula:

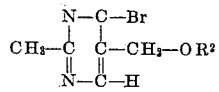

in which $R^2$ is an alkyl group, with ammonia to produce the corresponding 6-amino compound.

12. The process which comprises treating 2-methyl-6-bromo-pyrimethyl-ethyl ether with ammonia to produce the corresponding 6-amino compound.

13. The process which comprises treating a compound having the formula:

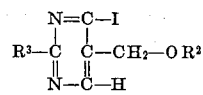

in which $R^2$ and $R^3$ are lower alkyl groups, with ammonia to produce the corresponding 6-amino compound.

14. The process which comprises treating a compound having the formula:

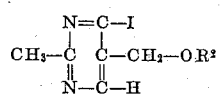

in which $R^2$ is a lower alkyl group, with ammonia to produce the corresponding 6-amino compound.

15. The process which comprises treating 2-methyl-6-iodo-pyrimethyl-ethyl ether with ammonia to produce the corresponding 6-amino compound.

16. Pyrimidine compounds having the formula:

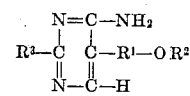

in which $R^2$ and $R^3$ are members of the class consisting of alkyl and aralkyl groups and $R^1$ is an alkylene group.

17. Pyrimidine compounds having the formula:

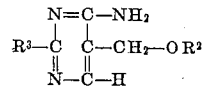

in which $R^2$ and $R^3$ are members of the class consisting of alkyl and aralkyl groups.

18. Pyrimidine compounds having the formula:

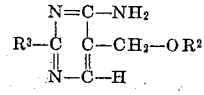

in which $R^2$ and $R^3$ are lower alkyl groups.

19. Pyrimidine compounds having the formula:

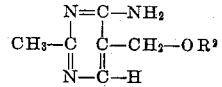

in which $R^2$ is a lower alkyl group.

20. 2-methyl-6-amino-pyrimethyl-ethyl ether.

ROBERT R. WILLIAMS.
JOSEPH K. CLINE.